(12) United States Patent
Chavez

(10) Patent No.: US 6,204,494 B1
(45) Date of Patent: Mar. 20, 2001

(54) COMPACT OPTICAL SCANNER WHEREIN THE PLATEN MEMBER LENGTH IS LESS THAN THE PLATEN MEMBER WIDTH

(75) Inventor: Martha A. Chavez, Greeley, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/289,505

(22) Filed: Apr. 9, 1999

(51) Int. Cl.[7] .................................................. H04N 1/04
(52) U.S. Cl. .............................. 250/208.1; 358/474
(58) Field of Search ................................ 250/208.1, 216, 250/234–236; 358/474, 493, 494

(56) References Cited

U.S. PATENT DOCUMENTS

| | | | |
|---|---|---|---|
| 4,370,641 | * 1/1983 | Kantor et al. | 250/208.1 |
| 5,038,028 | 8/1991 | Boyd et al. | 250/208.1 |
| 5,232,216 | 8/1993 | Bybee | 271/228 |
| 5,336,878 | 8/1994 | Boyd et al. | 250/208.1 |
| 5,339,107 | 8/1994 | Henry et al. | 348/270 |
| 5,410,347 | 4/1995 | Steinle et al. | 348/270 |
| 5,646,394 | 7/1997 | Steinle et al. | 250/208.1 |
| 5,907,413 | * 5/1999 | Han | 358/474 |

* cited by examiner

Primary Examiner—Stephone B. Allen

(57) ABSTRACT

A compact optical scanner is disclosed. The scanner may comprise a platen member having a length and a width; wherein the platen member length is measured along a first axis and the platen member width is measured along a second axis that is perpendicular to the first axis. The length of the platen member may be less than the width of the platen member. An imaging device may be movably mounted relative to the platen member.

12 Claims, 2 Drawing Sheets

COMPACT OPTICAL SCANNER WHEREIN THE PLATEN MEMBER LENGTH IS LESS THAN THE PLATEN MEMBER WIDTH

TECHNICAL FIELD OF THE INVENTION

The present invention relates generally to optical scanners and, more particularly, to a flatbed optical scanner that occupies minimal area.

BACKGROUND OF THE INVENTION

Optical scanners generate machine-readable image data representative of a scanned object, e.g., a paper document. Flatbed optical scanners are stationary devices which have a transparent, flat plate or platen upon which the object to be scanned is placed. The object is scanned by sequentially imaging narrow strips or scan line portions of the object on an imaging apparatus such as a charge-coupled device (CCD). The imaging apparatus produces image data which is representative of each scan line portion of the object which is imaged thereon.

In one type of flatbed scanner, the platen and the object remain stationary and at least a portion of the imaging assembly is moved relative to the object. The movement of the imaging apparatus changes the scan line portion which is currently being imaged. A flatbed optical scanner of the fixed platen type typically has a housing enclosing and shielding various optical and mechanical assemblies of the scanner. A transparent platen typically forms part of the top portion of the housing. The object being scanned is placed on the platen and the imaging apparatus moves beneath the platen to generate image data representing the object. The imaging apparatus moves a distance which is approximately equal to the length of the platen, thus, the housing is required to occupy an area at least as great as the platen.

An automatic document feeding mechanism may be attached to the scanner to alleviate the need for a user to place a document on the platen. When the scanner uses the automatic document feeding mechanism, the imaging apparatus typically remains stationary relative to the platen. The automatic document feeding mechanism moves the document over the platen past the imaging apparatus, thus, creating relative movement between the imaging apparatus and the document. Scan line portions of the document are converted to image data in the manner described above. The automatic document feeding mechanism typically bends the document as it moves the document over the platen. Thus, relatively rigid documents, such as photographs, cannot be placed through the automatic document feeding mechanism without the possibility of being damaged. Furthermore, a rigid document may not feed correctly, thereby causing the image data to be an incorrect representation of the object. Accordingly, when a rigid document is to be scanned, the document is generally manually placed on the platen and the imaging apparatus is moved in a manner as previously described.

The scanner outputs the image data representative of the scanned object to a computer, such as a desktop computer. The computer receives the image data and processes the image data per user instructions. These instructions may include printing or faxing a document representative of the processed image data and storing the image data.

Flatbed scanners are disclosed in the following patents, each of which is hereby incorporated by reference for all that is disclosed therein: Boyd et al., U.S. Pat. No. 4,926,041 for OPTICAL SCANNER; Boyd et al., U.S. Pat. No. 5,336,878 for VARIABLE SPEED SINGLE PASS COLOR OPTICAL SCANNER; Boyd et al., U.S. Pat. No. 5,038,028 for OPTICAL SCANNER APERTURE AND LIGHT SOURCE ASSEMBLY; Henry et al., U.S. Pat. No. 5,339,107 for COLOR OPTICAL SCANNER WITH ROTATING COLOR FILTER ASSEMBLY; Steinle et al., U.S. Pat. No. 5,410,347 for COLOR OPTICAL SCANNER WITH IMAGE REGISTRATION HOLDING ASSEMBLY; and Steinle et al., U.S. Pat. No. 5,646,394 for IMAGING DEVICE WITH BEAM STEERING CAPABILITY.

In recent years, the number of peripheral devices that may be connected to a computer has increased significantly. These peripheral devices include a printer, a pointing device, larger monitors than used in the past, and a scanner. These peripheral devices typically occupy desk space in the vicinity of the computer. As was described above, a flatbed scanner occupies an area at least as great as the platen, which is at least as great as the objects which it scans. In the case where the flatbed scanner is used to scan documents, the scanner occupies an area greater than the documents. Therefore, a need exists for a flatbed scanner that is able to scan large documents and rigid objects and occupies minimal area.

SUMMARY OF THE INVENTION

A compact optical scanner is disclosed herein. The scanner may comprise a platen member having a width and a length; wherein the platen member width is measured along a first axis and the platen member length is measured along a second axis which is perpendicular to the first axis. The width of the platen member may be less than the length of the platen member. An imaging device may be movably mounted relative to the platen member.

A method of scanning an object is also disclosed herein. The method may comprise: providing a platen member having a width and a length; wherein the platen member width is measured along a first axis and the platen member length is measured along a second axis which is perpendicular to the first axis; providing an imaging device movably mounted relative to the platen member; placing the object on the platen member opposite the imaging device; moving the imaging device along the second axis a distance not greater than the platen member width; and generating an image of the object with the imaging device.

BRIEF DESCRIPTION OF THE DRAWING

An exemplary embodiment of the invention is shown in the accompanying drawing in which.

DETAILED DESCRIPTION OF THE INVENTION

Figure 1:
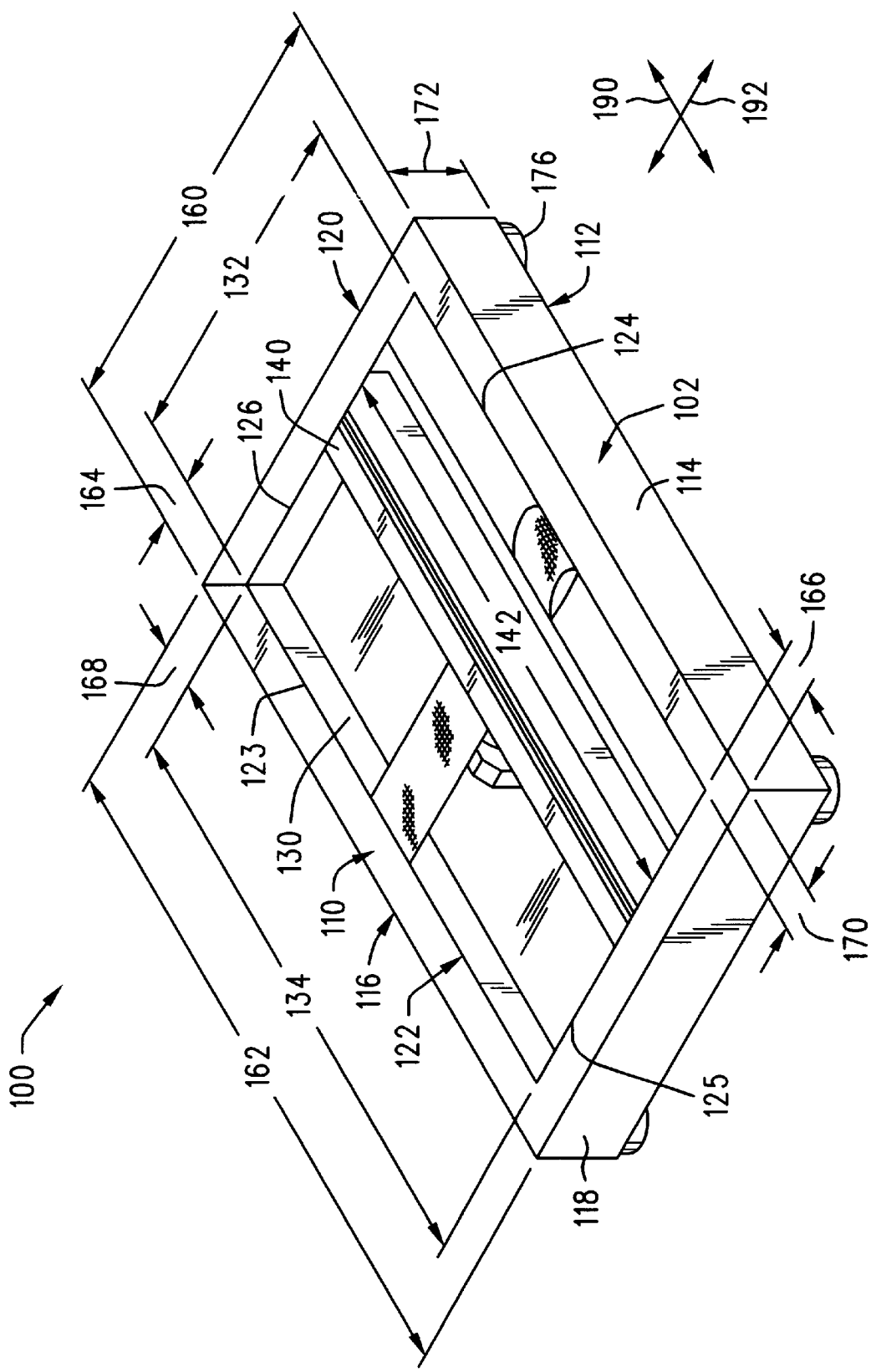
FIG. 1 is a top perspective view of a scanner.
Figure 2:
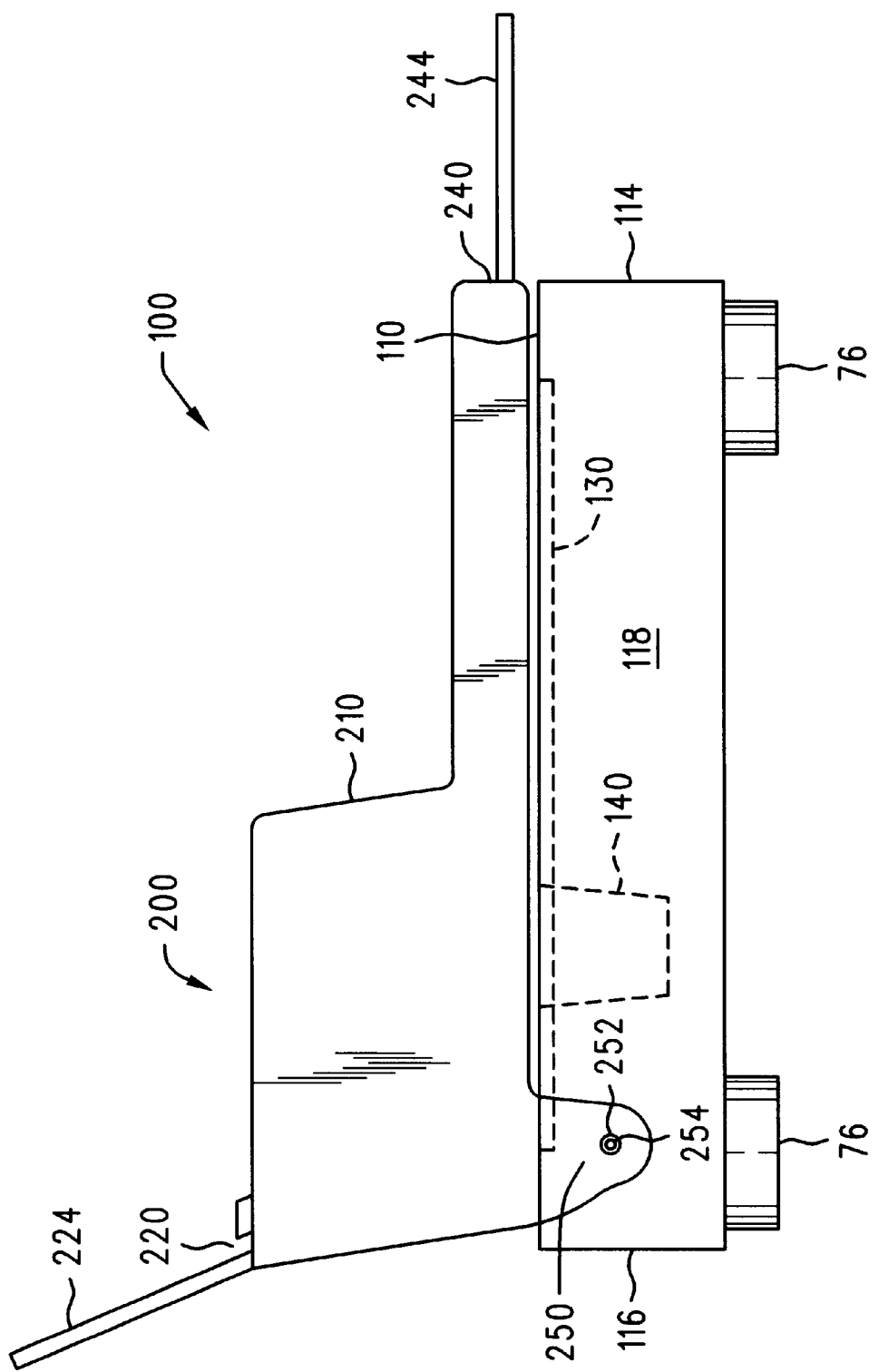
FIG. 2 is a side view of the scanner of FIG. 1 with the addition of an automatic document feeder.

FIGS. 1 and 2, in general, describe an optical scanner 100 comprising: a platen member 130 having a width 134 and a length 132; wherein the platen member width 134 is measured along a first axis 190 and the platen member length 132 is measured along a second axis 192; an imaging device 140 movably mounted relative to the platen member 130; wherein the first axis 190 is perpendicular to the second axis 192; and wherein the platen member length 132 is less than the platen member width 134.

FIGS. 1 and 2 also, in general, describe a method of scanning an object comprising: providing a platen member 130 having a width 134 and a length 132; wherein the platen member width 134 is measured along a first axis 190 and the platen member length 132 is measured along a second axis 192; and wherein the first axis 190 and the second axis 192 are perpendicular; providing an imaging device 140 movably mounted relative to the platen member 130; placing the object on the platen member 130 opposite the imaging device 140; moving the imaging device 140 along the second axis 192 a distance not greater than the platen member length 132; and generating an image of the object with the imaging device 140.

Having thus described the scanner 100 and a method of scanning in general, a more detailed description of the scanner 100 and method will now be provided.

In summary, the scanner 100 is a compact flatbed scanner that is adapted to scan different types of objects. The area where the scanning occurs, commonly referred to as a platen 130, may be relatively short and wide, which allows for the scanner 100 to be relatively compact. The scanner 100 may operate in a flatbed mode and a document feeding mode. The flatbed mode is typically used for scanning relatively rigid and small objects, such as photographs, that cannot be placed through an automatic document feeder 200. In this mode, the object is placed on the platen 130 and scanned. The document feeding mode is used for scanning a relatively long and flexible document, such as a page of text. The document is placed in an automatic document feeder and is moved across the platen 130 where it is scanned. There are virtually no limitations to the length of a document to be scanned in the document feeding mode. The following description focuses on the scanner 100 operating in the flatbed mode followed by a description of the scanner 100 operating in the automatic document mode.

Having summarized the scanner 100, it will now be described in detail. FIG. 1 illustrates an embodiment of the scanner 100. The scanner 100 may have a housing 102 comprising a top portion 110, a bottom portion 112, a front portion 114, a back portion 116, a left portion 118, and a right portion 120. The top portion 110 and the bottom portion 112 may be separated by a height 172. The back portion 116 and the front portion 114 may be separated by a length 160. The left portion 118 and the right portion 120 may be separated by a width 162. A plurality of conventional feet 176 may be affixed to the bottom portion 112. The width 162 may be measured along an x-axis 190 and the length 160 may be measured along a y-axis 192. The x-axis 190 may be perpendicular to the y-axis 192. An objective in the design of the scanner 100 is to minimize the width 162 and the length 160.

An opening 122 may be formed in the top portion 110. The opening 122 may have a back edge 123, a front edge 124, a left edge 125, and a right edge 126. The opening 122 may have a length 132, e.g., 5 inches, extending between back edge 123 and the front edge 124. The opening 122 may have a width 134, e.g., 8.5 inches, extending between the left edge 125 and the right edge 126. The back edge 123 may be located a back distance 164 from the back portion 116 of the housing 102. The front edge 124 may be located a front distance 170 from the front portion 114. The left edge 125 may be located a left distance 166 from the left portion 118. The right edge 126 may be located a right distance 168 from the right portion 120. As will be described below, an objective in the design of the scanner 100 is to minimize the back length 164, the left length 166, the right length 168, and the front length 170, which, in turn, minimizes the width 162 and the length 160 of the housing 102 accordingly.

A platen 130 may be appropriately sized so as to be located within the opening 122. Specifically, the dimensions of the platen 130 may be substantially similar to the dimensions of the opening 122. The platen 130 may be a plate of transparent material, such as a plate of glass. An imaging apparatus 140 may be movably mounted within the housing 102 beneath the platen 130. The imaging apparatus 140 may, as an example, be mounted to a set of rails located within the housing 102 in a conventional manner. Specifically, the imaging apparatus 140 may be movable along the y-axis 192 a distance approximately equal to the length 132 of the opening 122. The imaging apparatus 140 may serve to convert an image of the object being scanned to image data.

A lid may be attached to the housing 102 in a conventional manner. For illustration purposes, the lid has not been illustrated in FIG. 1. The lid may be pivotally attached to the housing 102 and may serve to cover the platen 130 so as to keep extraneous light from entering the housing 102.

An objective in the design of the scanner 100 is to minimize the area occupied by the scanner. This objective may be achieved by minimizing the width 162 and length 160 of the housing 102. The minimum width 162 and length 160 are governed by the width 134 and length 132 of the opening 122 in addition to the back length 164, the left length 166, the right length 168, and the front length 170. The back length 164, the left length 166, the right length 168, and the front length 170 may serve to house electrical and mechanical devices necessary to operate the scanner 100 in addition to providing structural support for the platen 130. The back length 164, the left length 166, the right length 168, and the front length 170 may, for example, be minimized by forming the housing 102 with stronger materials and locating the electrical and mechanical devices underneath the imaging apparatus 140.

The width 134 and length 132 of the opening 122 and, thus, the platen 130, may be minimized by limiting the size of the opening 122 to the maximum size of objects that are to be scanned. As an example, if the scanner 100 is used to scan standard sized photographs, then the opening 122 may have a width 162 of 3, 4 or 5 inches and a length 160 of 5, 6, or 7 inches respectively. By selecting the size of the opening 122 to correspond to the size of the objects to be scanned, the area occupied by the platen 130 is used efficiently during the scanning process. Excess area occupied by the scanner 100 is, thus, minimized. As an example, if the scanner 100 is to be used to scan photographs that are no greater than four inches by six inches, the opening 122 may have a width 162 of six inches and a length 160 of four inches. Accordingly, the platen 130 will have similar dimensions.

Having described the structure of the scanner 100, its basic operation will now be described. The scanner 100 serves to convert an image of an object, e.g., a photograph, to image data. The process of converting an image of an object to image data is known as scanning the object. The scanner 100 may transmit the image data to a computer for processing via a conventional means such as a data cable or an infrared transmission.

The scanning process commences with the object to be scanned being placed onto the platen 130 so that the portion of the object to be scanned faces into the housing 102. The lid, not shown, may be placed over the top portion 110 of the housing 102 to prevent extraneous light from entering the housing 102 through the platen 130. A scanning command is then initiated, which causes the imaging apparatus 140 to move relative to the object along the y-axis 192 a distance approximately equal to the length 132 of the opening 122. As the imaging apparatus 140 moves, the imaging device generates image data representing the object in a conventional manner. As described above, the image data is then transmitted to a computer for processing.

The relatively small dimensions of the opening 122, as described above, limit the utility of the scanner 100 to scanning relatively small objects, such as photographs. The utility of the scanner 100 may be increased by the addition of an automatic document feeder (ADF) 200 as illustrated in FIG. 2. The ADF 200 is a device that moves a relatively flexible object, such as a paper document, across the platen 130. The ADF 200 may have a housing 210 with an input paper support 224 and an output paper support 244 attached to the housing 210. A paper input port 220 may be located in the proximity of the input paper support 224. A paper output port 240 may be located in the proximity of the output paper support 244. The ADF 200 may be configured to set upon the top portion 110 of the housing 102. The ADF 200 may be appropriately sized so that it covers the platen 130 and, thus, serves as a lid as was described above. An example of an automatic document feeder is disclosed in the U.S. Pat. No. 5,232,216 of Bybee for SHEET FEEDING APPARATUS FOR FLAT BED OPTICAL SCANNER, which is hereby incorporated by reference for all that is disclosed therein.

The housing 210 of the ADF 200 may have a pivotal portion 250 that extends along the left portion 118 of the scanner housing 102. The housing 210 may have a similar portion (not shown) that extends along the right portion 120, FIG. 1, of the scanner housing 102. The left portion 118 of the housing 102 may have a pin 254 that extends normal to the surface of the left portion 118. The pivotal portion 250 may have a hole 252 that is appropriately located so as to encompass the pin 254. The hole 252 and the pin 254 function as a hinge mechanism, and serve to make the ADF 200 pivotally attached to the housing 102. A similar hinge mechanism may be located with reference to the right portion 120, FIG. 1, of the housing 102.

The ADF 200 serves to create relative movement between a document being scanned and the imaging apparatus 140. This is achieved by moving the document relative to the housing 102 and instructing the scanner 100 to hold the imaging apparatus 140 stationary relative to the housing 102. The document to be scanned is placed on the input paper support 224 so that one end of the document is located in the input paper port 220. Upon an instruction from the user or the computer to which the scanner 100 is connected, the imaging apparatus 140 moves to a predetermined location. The ADF 200 then moves the document through the housing 210 so that it contacts the platen 130 in the vicinity of the imaging apparatus 140. As the document passes over the vicinity of the imaging apparatus 140, the imaging apparatus 140 generates image data representing the document as described above. The document is then fed out the output paper port 240 and onto the output paper support 244.

Referring again to FIG. 1, the width 134 of the opening 122 of the scanner 100 equipped with the ADF 200, FIG. 2, may be at least as wide as a sheet of paper that is to be scanned, e.g., 8½ inches or 21 centimeters. If the length 132 of the opening 122 is as long as a photograph, e.g., five inches, the scanner 100 may be able to scan relatively flexible and long objects, such as documents, and relatively rigid objects, such as photographs. The long, flexible objects may be scanned by placing them through the automatic document feeder 200, FIG. 2. The rigid objects may be scanned by placing them directly on the platen 130 in a conventional manner. The scanner 100, equipped with the ADF 200 is, thus, able to perform many of the functions of a conventional flatbed scanner, however, the scanner 100 does not occupy the extensive area occupied by a conventional flatbed scanner.

Several embodiments of the scanner 100 may be used in the design of the scanner 100. For example, referring to FIG. 1, the length 132 of the opening 122 may be approximately equal to the width 134 of the opening 122. The length 132 of the opening 122 is only required to be as great as the width of an object which is to be scanned. In another embodiment, the ADF 200 may have removable extension pieces attached to the input paper support 224 and the output paper support 244. These removable extension pieces may be used to support large documents that are to be fed through the ADF 200. When the removable extension pieces are not required to be used, they may be removed, e.g., folded into the housing 210, so as not to increase the area occupied by the scanner 100 when it is idle.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. An optical scanner comprising:

a platen member having a length and a width; wherein said platen member length is measured along a first axis and said platen member width is measured along a second axis;

an imaging device movably mounted relative to said platen member along said first axis;

wherein said first axis is perpendicular to said second axis; and wherein said platen member length is less than said platen member width.

2. The optical scanner of claim 1 wherein said imaging device is movable relative to said platen member along said first axis through a distance less than said platen member width.

3. The optical scanner of claim 1 wherein said imaging device is movable relative to said platen member along said first axis a distance of about four inches.

4. The optical scanner of claim 1 wherein said imaging device is movable relative to said platen along said first axis a distance of about five inches.

5. The optical scanner of claim 1 wherein said platen member width is about eight and one half inches.

6. The optical scanner of claim 1 wherein said platen member width is about twenty-one centimeters.

7. The optical scanner of claim 1 further comprising an automatic document feeding device.

8. The optical scanner of claim 7 further comprising a housing wherein said automatic document feeding device is pivotally attached to said housing.

9. A method of scanning an object comprising:

providing a platen member having a length and a width; wherein said platen member length is measured along a first axis and said platen member width is measured along a second axis; wherein said first axis and said second axis are perpendicular; and wherein said platen member length is less than said platen member width;

providing an imaging device movably mounted relative to said platen member along said first axis;

placing said object on said platen member opposite said imaging device;

moving said imaging device along said first axis a distance not greater than said platen member width; and generating an image of said object with said imaging device.

10. The method of claim 9 wherein said moving comprises moving said imaging device along said first axis a distance of about four inches.

11. The method of claim 9 wherein said moving comprises moving said imaging device along said first axis a distance of about five inches.

12. The method of claim 9 further comprising:

providing an automatic document feeding device associated with said platen member;

wherein said placing comprises placing a document in said automatic document feeding device; and wherein said moving comprises moving said document relative to said imaging device along said first axis with said automatic feeding device.

* * * * *